United States Patent [19]
Murakami et al.

[11] 3,971,267
[45] July 27, 1976

[54] SPEED CHANGE GEAR SYSTEM

[75] Inventors: Noboru Murakami, Nagoya; Koichi Matsuo, Toyota; Koichiro Hirosawa, Kariya; Kazuo Ohara, Toyota, all of Japan

[73] Assignee: Aisin Seiki Kabushiki Kaisha, Japan

[22] Filed: Aug. 29, 1974

[21] Appl. No.: 501,680

[30] Foreign Application Priority Data
Aug. 29, 1973 Japan.................................. 48-97514

[52] U.S. Cl.................................. 74/759; 74/767; 74/769; 74/770
[51] Int. Cl.².......................................... F16H 57/10
[58] Field of Search ............ 74/753, 758, 759, 766, 74/767, 768, 769, 770

[56] References Cited
UNITED STATES PATENTS
| | | | |
|---|---|---|---|
| 2,651,950 | 9/1953 | Schou................................... | 74/759 |
| 2,930,258 | 3/1960 | Flinn................................... | 74/759 X |
| 3,482,469 | 12/1969 | Mori................................... | 74/759 X |
| 3,503,282 | 3/1970 | Peterson............................... | 74/759 |
| 3,823,622 | 7/1974 | Mori et al............................. | 74/759 |

*Primary Examiner*—Samuel Scott
*Assistant Examiner*—Lance W. Chandler
*Attorney, Agent, or Firm*—Oblon, Fisher, Spivak, McClelland & Maier

[57] ABSTRACT

A speed change gear system for providing at least four forward drive speed ranges and one reverse drive speed range includes two planetary gear sets of the single-pinion type and one planetary gear set of the double-pinion type, two clutches, and three brakes. As a result of the coupling and uncoupling of the clutches and brakes, the movable elements of each of the planetary gear sets are suitably coupled so as to attain the various speed ranges.

15 Claims, 9 Drawing Figures

– 3,971,267 –

SPEED CHANGE GEAR SYSTEM

BACKGROUND OF THE INVENTION

1. Field of the Invention

The present invention relates generally to speed change gear systems and more particularly to a speed change gear system which is adapted for application with fluid couplings utilized within motor vehicles, especially automobiles.

2. Description of the Prior Art

It is preferable to utilize at least four gear sets within the speed change gear systems of large automotive vehicles, such as for example, trucks and buses, and in order to attain a speed change mechanism having more than four speed shifts, three, four or even more sets of simple, single-pinion or double-pinion type planetary gear sets have heretofore been combined. While the combination of these gears may be widely varied, it is preferable however that the following conditions be attained:

1. The output shaft should be coupled to the same elements within each speed range.

2. In order to reduce the circumferential speed of the bearings of each element of the planetary gear set, the number of its revolutions should be small.

3. The tooth load, that is, the tangential force of each element should be small so as to maintain the strength of the gear teeth.

4. The gear set should always attain meshing conditions for the number of teeth required. For example, the sun gear, whose diameter is to be minimized, as well as each planetary pinion gear, should have the necessary number of teeth.

5. Within the planetary gear set, the coupling relationship among the elements should be simple and the distance from each other should be small.

6. During speed shifts, wherein frictional coupling means are utilized during forward drive, such speed shifts should be available through one coupling means alone.

SUMMARY OF THE INVENTION

Accordingly, it is an object of the present invention to provide a speed change gear system which provides at least four speed ranges for forward drive and one speed range for reverse drive by the use of two planetary gear sets of the single-pinion type and one simple planetary gear set of the double-pinion type, two clutches, and three brakes, whereby the movable members of each of the planetary gear sets are suitably coupled as a result of the coupling or uncoupling of the clutches and brakes so as to attain the various speed ranges.

BRIEF DESCRIPTION OF THE DRAWINGS

Various other objects, features and attendant advantages of the present invention will be more fully appreciated as the same becomes better understood from the following detailed description when considered in conjunction with the accompanying drawings, in which like reference characters designate like or corresponding parts throughout the several views, and wherein.

DESCRIPTION OF THE PREFERRED EMBODIMENTS

Figure 1A:
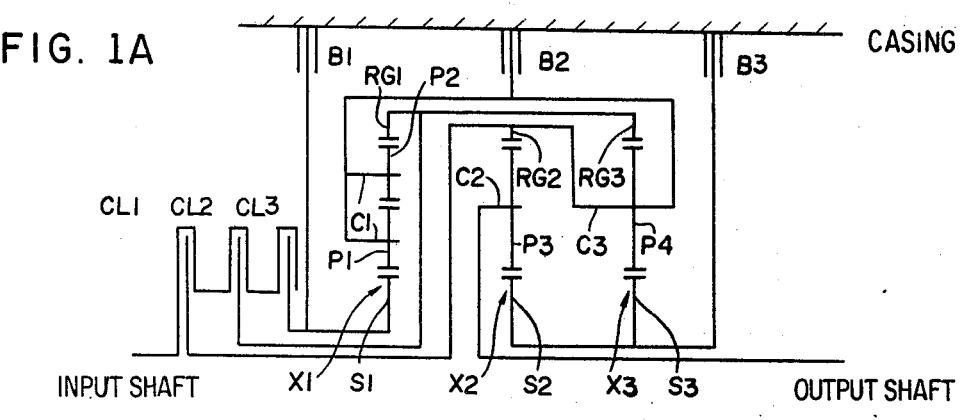
FIG. 1A is a schematic view of one embodiment of a speed change gear system constructed in accordance with the present invention and disclosing its cooperative parts.

Referring now to the drawings and more particularly to FIG. 1A thereof, the disclosed speed change gear system includes a first planetary gear set generally indicated by the reference character $X_1$ of the double-pinion type, a second planetary gear set generally indicated by the reference character $X_2$ of the single-pinion type, and a third planetary gear set generally indicated by the reference character $X_3$ of the single-pinion type, all of which are interposed between an input shaft and an output shaft. The first planetary gear set $X_1$ is seen to comprise a first sun gear $S_1$, first planetary gear $P_1$ engaged with the first sun gear $S_1$, a second planetary gear $P_2$ engaged with the first planetary gear $P_1$, a first ring gear $RG_1$ enmeshed with the second planetary gear $P_2$, and a first carrier $C_1$ rotatably supporting the first and second planetary gears $P_1$, $P_2$, while the second planetary gear set $X_2$ similarly includes a second sun gear $S_2$, a third planetary gear $P_3$ engaged with the second sun gear $S_2$, a second ring gear $RG_2$ enmeshed with the third planetary gear $P_3$ and a second carrier $C_2$ rotatably supporting the third planetary gear $P_3$ and connected to the output shaft.

The third planetary gear set $X_3$ includes a third sun gear $S_3$, a fourth planetary gear $P_4$ engaged with the third sun gear $S_3$, a third ring gear $RG_3$ enmeshed with the fourth planetary gear $P_4$, and a third carrier $C_3$ rotatably supporting the fourth planetary gear $P_4$. The second ring gear $RG_2$, the third carrier $C_3$ and the first carrier $C_1$ are serially connected with each other and a first clutch $CL_1$ serves to couple or uncouple the second ring gear $RG_2$, the third carrier $C_3$ and the first carrier $C_1$ with the input shaft. The first ring gear $RG_1$ and the third ring gear $RG_3$ are similarly drivingly engaged with each other and a second clutch $CL_2$ serves to couple or uncouple the first ring gear $RG_1$ and the third ring gear $RG_3$ with the input shaft. Still further, a third clutch $CL_3$ serves to couple or uncouple the input shaft and the first sun gear $S_1$.

A first brake $B_1$ is interposed between the first sun gear $S_1$ and the gear casing so as to be capable of locking the first sun gear $S_1$ to the casing when the first brake is actuated and similarly, a second brake $B_2$ is interposed between the casing and the element set comprising the second ring gear $RG_2$, the third carrier $C_3$ and the first carrier $C_1$ so as to be capable of locking them to the casing when the second brake is actuated. The second sun gear $S_2$ and the third sun gear $S_3$ are drivingly engaged, and a third brake $B_3$ is disposed between the casing and the second and third sun gears $S_2$ and $S_3$ so as to be capable of locking the second and third sun gears $S_2$ and $S_3$ to the casing when the brake is actuated.

The following equations are given as characteristic of the planetary gear sets $X_1$, $X_2$ and $X_3$:

$$N_{RG_1} - (1 - I_1)N_{C_1} - I_1 N_{S_1} = 0$$
$$N_{RG_2} - (1 + I_2)N_{C_2} + I_2 N_{S_2} = 0$$
$$N_{RG_3} - (1 + I_3)N_{C_3} + I_3 N_{S_3} = 0$$

wherein:

$N_{RG_1}$, $N_{RG_2}$, $N_{RG_3}$ = the number of revolutions of the first, second and third ring gears;

$N_{C_1}$, $N_{C_2}$, $N_{C_3}$ = the number of revolutions of the first, second and third carriers;

$N_{S_1}$, $N_{S_2}$, $N_{S_3}$ = the number of revolutions of the first, second and third sun gears; and $I_1$, $I_2$, $I_3$ = the radial ratios of each ring gear to each sun gear.

Within this embodiment, the radial ratios within each speed range are $I_1 = 0.419$, $I_2 = 0.548$, $I_3 = 0.548$. Table 1B shows the relationship between the operation of clutches $CL_1$, $CL_2$ and $CL_3$ and brakes $B_1$, $B_2$ and $B_3$ relative to the gear ratio within each speed range, wherein $F_n$ ($n = 1, 2, 3, \ldots$) designates a forward speed range, such as for example, $F_1$ designates the first forward speed range, $F_2$ designates the second forward speed range, etc. and $R_n$ ($n = 1, 2, \ldots$) designates a reverse speed range, such as for example, $R_1$ designates the first reverse speed range, and it may be seen that a reduction gear ratio of 1 : 1.00 can be obtained by desirably and selectively employing two of the clutches $CL_1$, $CL_2$ and $CL_3$. Table 1C shows the relationship regarding the number of revolutions and the tangential forces of each of the elements of the planetary gear sets within each speed range. The ratio of the number of revolutions is based upon the assumption that the number of revolutions of the input shaft is 1, while the designated tangential forces are based upon the assumption that the input shaft torque exerted upon the ring gear is 1, the tangential forces of the planetary gears being equal to those of the sun gears and the ring gears.

Within Table 1C, like reference characters designate identical or corresponding parts shown within Table 1B, and in addition, A designates a particular speed range, B designates an element of the planetary gear set, N designates the number of revolutions, and W designates the tangential force. Because the reduction gear ratio of the fourth forward speed range $F_4$ is 1 : 1.00, the number of revolutions N of each sun gear, ring gear, and carrier is 1.00, the number of revolutions N of an individual sun gear, ring gear and carrier is 1.00, and the number of revolutions N of each planetary gear is 0.00. The tangential forces W are therefore considerably less than those produced within the other speed ranges. Within the other speed ranges, the torque of the input shaft is transmitted to all of the elements through only one engaged clutch, while to the contrary, the torque of the input shaft of the fourth speed range $F_4$ is distributed to all elements as a result of engaging at least two clutches, and accordingly, it is clear that the resulting tangential forces of the elements of such speed range are smaller than those produced as a result of the transmission of torque from the input shaft as a result of coupling only one clutch. Hereinafter, a discussion of the number of revolutions N and the tangential forces W within the speed range having the reduction gear ratio of 1 : 1.00 will be omitted.

TABLE 1B

| | CL1 | CL2 | CL3 | B1 | B2 | B3 | B4 | Reduction gear ratio |
|---|---|---|---|---|---|---|---|---|
| F1 | | | O | | | O | | 1 : 3.57 |
| F2 | | O | | | | O | | 1 : 2.40 |
| F3 | O | | | | | O | | 1 : 1.55 |
| F4 | O | O | | | | | | 1 : 1.00 |
| F5 | O | | | | O | | | 1 : 0.79 |
| F6 | | | | | O | O | | 1 : 0.46 |
| R1 | | | O | O | | | | 1 : −3.70 |
| R2 | | O | | O | | | | 1 : −1.55 |

TABLE 1C

| A | B | X1 | | | | | X2 | | | | X3 | | | |
|---|---|---|---|---|---|---|---|---|---|---|---|---|---|---|
| | | S1 | C1 | RG1 | P1 | P2 | S2 | C2 | RG2 | P3 | S3 | C3 | RG3 | P4 |
| F1 | N | 1.00 | 0.43 | 0.67 | −0.86 | 0.86 | 0.0 | 0.28 | 0.43 | 0.68 | 0.0 | 0.43 | 0.67 | 1.05 |
| | W | 2.39 | 4.77 | 2.39 | 2.39 | 2.39 | 2.31 | 4.62 | 2.31 | 2.31 | 2.39 | 4.77 | 2.39 | 2.39 |
| F2 | N | 1.49 | 0.65 | 1.00 | −1.29 | 1.29 | 0.00 | 0.42 | 0.65 | 1.01 | 0.0 | 0.65 | 1.00 | 1.57 |
| | W | 0.0 | 0.00 | 0.00 | 0.00 | 0.00 | 1.55 | 3.10 | 1.55 | 1.55 | 1.00 | 2.00 | 1.00 | 1.00 |
| F3 | N | 2.31 | 1.00 | 1.55 | −1.99 | 1.99 | 0.0 | 0.65 | 1.00 | 1.57 | 0.0 | 1.00 | 1.55 | 2.42 |
| | W | 0.0 | 0.00 | 0.00 | 0.00 | 0.00 | 1.00 | 2.00 | 1.00 | 1.00 | 0.00 | 0.00 | 0.00 | 0.00 |
| F4 | N | 0.0 | 1.00 | 0.58 | 1.52 | −1.52 | 1.76 | 1.27 | 1.00 | −1.20 | 1.76 | 1.00 | 0.58 | 1.85 |
| | W | 0.51 | 1.02 | 0.51 | 0.51 | 0.51 | 0.51 | 1.02 | 0.51 | 0.51 | 0.51 | 1.02 | 0.51 | 0.51 |
| F5 | N | 0.0 | 1.72 | 1.00 | 2.62 | −2.62 | 3.04 | 2.19 | 1.72 | −2.06 | 3.04 | 1.72 | 1.00 | 3.19 |
| | W | 1.30 | 2.59 | 1.30 | 1.30 | 1.30 | 0.30 | 0.59 | 0.30 | 0.30 | 0.30 | 0.59 | 0.30 | 0.30 |
| R1 | N | 1.00 | 0.0 | 0.42 | −1.52 | 1.52 | −0.76 | −0.27 | 0.0 | 1.20 | −0.76 | 0.0 | 0.42 | 1.85 |
| | W | 2.39 | 4.77 | 2.39 | 2.39 | 2.39 | 2.39 | 4.77 | 2.39 | 2.39 | 2.39 | 4.77 | 2.39 | 2.39 |
| R2 | N | 2.39 | 0.0 | 1.00 | −3.64 | 3.64 | −1.82 | −0.65 | 0.0 | 2.86 | −1.82 | 0.0 | 1.00 | 4.42 |
| | W | 0.0 | 0.0 | 0.00 | 0.00 | 0.00 | 1.00 | 2.00 | 1.00 | 1.00 | 1.00 | 2.00 | 1.00 | 1.00 |

Figure 2A:
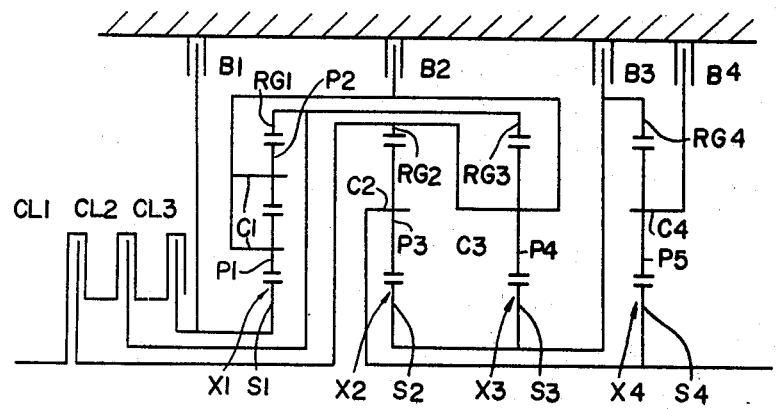
FIG. 2A is a schematic view similar to that of FIG. 1 showing however another embodiment of the present invention.

Referring now to FIG. 2A there is shown another embodiment of the present invention wherein a fourth planetary gear set generally indicated by the reference character $X_4$ of the single-pinion type is interposed between the third planetary gear set $X_3$ and the output shaft, such fourth planetary gear set $X_4$ including a fourth sun gear $S_4$ connected to the output shaft as well as to the second carrier $C_2$, a fifth planetary gear $P_5$ engaged with the fourth sun gear $S_4$, a fourth ring gear $RG_4$ enmeshed with the fifth planetary gear $P_5$, and a fourth carrier $C_4$ rotatably supporting the fifth planetary gear $P_5$. The fourth ring gear $RG_4$ is also drivingly engaged with the second and third sun gears $S_2$ and $S_3$ and is additionally locked, in conjunction with the second and third sun gears $S_2$ and $S_3$, to the gear casing when the third brake $B_3$ is actuated. A fourth brake $B_4$ is also interposed between the fourth carrier $C_4$ and the casing so as to be capable of locking the former to the latter when the brake is actuated.

The following formula is given as characteristic of the fourth planetary gear set $X_4$:

$$N_{RG_4} - (1 + I_4)N_{C_4} + I_4 N_{S_4} = 0$$

wherein:

$N_{RG_4}$ = the number of revolutions of the fourth ring gear;

$N_{C_4}$ = the number of revolutions of the fourth carrier;

$N_{S_4}$ = the number of revolutions of the fourth sun gear; and $I_4$ = the radial ratio of the fourth ring gear to the fourth sun gear.

Within this embodiment, the radial ratio within each speed range is $I_4 = 0.562$. Table 2B shows the relationship between the operation of all clutches $CL_1$, $CL_2$, and $CL_3$ and brakes $B_1$, $B_2$, $B_3$ and $B_4$ with respect to the reduction gear ratio within each speed range and Table 2C shows the relationship regarding the number of revolutions and the tangential forces of the elements of the planetary gear sets within each speed range.

TABLE 2B

|   | CL1 | CL2 | CL3 | B1 | B2 | B3 | B4 | Reduction gear ratio |
|---|---|---|---|---|---|---|---|---|
| F1 |  |  | O |  |  |  | O | 1 : 5.02 |
| F2 |  |  | O |  |  | O |  | 1 : 3.57 |
| F3 |  | O |  |  |  |  | O | 1 : 3.18 |
| F4 |  | O |  |  |  | O |  | 1 : 2.40 |
| F5 | O |  |  |  |  |  | O | 1 : 1.86 |
| F6 | O |  | O |  |  | O |  | 1 : 1.55 |
| F7 | O | O |  |  |  |  |  | 1 : 1.00 |

TABLE 2B-continued

|   | CL1 | CL2 | CL3 | B1 | B2 | B3 | B4 | Reduction gear ratio |
|---|---|---|---|---|---|---|---|---|
| F8 | O |  |  |  | O |  |  | 1 : 0.79 |
| F9 |  | O |  |  | O |  |  | 1 : 0.46 |
| R1 |  |  | O | O |  |  |  | 1 : −3.70 |
| R2 |  | O |  | O |  |  |  | 1 : −1.55 |

TABLE 2C

| A | B | X1 S1 | C1 | RG1 | P1 | P2 | X2 S2 | C2 | RG2 | P3 |
|---|---|---|---|---|---|---|---|---|---|---|
| F1 | N | 1.00 | 0.37 | 0.63 | −0.96 | 0.96 | −0.11 | 0.20 | 0.37 | 0.75 |
|  | W | 2.39 | 4.77 | 2.39 | 2.39 | 2.39 | 2.31 | 4.62 | 2.31 | 2.31 |
| F2 | N | 1.00 | 0.43 | 0.67 | −0.86 | 0.86 | 0.0 | 0.28 | 0.43 | 0.68 |
|  | W | 2.39 | 4.77 | 2.39 | 2.39 | 2.39 | 2.31 | 4.62 | 2.31 | 2.31 |
| F3 | N | 1.58 | 0.58 | 1.00 | −1.51 | 1.51 | −0.18 | 0.31 | 0.58 | 1.19 |
|  | W | 0.0 | 0.00 | 0.00 | 0.00 | 0.00 | 1.55 | 3.10 | 1.55 | 1.55 |
| F4 | N | 1.49 | 0.65 | 1.00 | −1.29 | 1.29 | 0.0 | 0.42 | 0.65 | 1.01 |
|  | W | 0.0 | 0.00 | 0.00 | 0.00 | 0.00 | 1.55 | 3.10 | 1.55 | 1.55 |
| F5 | N | 2.70 | 1.00 | 1.71 | −2.60 | 2.60 | −0.30 | 0.54 | 1.00 | 2.00 |
|  | W | 0.0 | 0.00 | 0.00 | 0.00 | 0.00 | 1.00 | 2.00 | 1.00 | 1.00 |
| F6 | N | 2.31 | 1.00 | 1.55 | −1.99 | 1.99 | 0.0 | 0.65 | 1.00 | 1.57 |
|  | W | 0.0 | 0.00 | 0.00 | 0.00 | 0.00 | 1.00 | 2.00 | 1.00 | 1.00 |
| F8 | N | 0.0 | 1.00 | 0.58 | 1.52 | −1.52 | 1.76 | 1.27 | 1.00 | −1.20 |
|  | W | 0.51 | 1.02 | 0.51 | 0.51 | 0.51 | 0.51 | 1.02 | 0.51 | 0.51 |
| F9 | N | 0.0 | 1.72 | 1.00 | 2.62 | −2.62 | 3.04 | 2.19 | 1.72 | −2.06 |
|  | W | 1.30 | 2.59 | 1.30 | 1.30 | 1.30 | 0.30 | 0.59 | 0.30 | 0.30 |
| R1 | N | 1.00 | 0.0 | 0.42 | −1.52 | 1.52 | −0.76 | −0.27 | 0.0 | 1.20 |
|  | W | 2.39 | 4.77 | 2.39 | 2.39 | 2.39 | 2.39 | 4.77 | 2.39 | 2.39 |
| R2 | N | 2.39 | 0.0 | 1.00 | −3.64 | 3.64 | −1.82 | −0.65 | 0.0 | 2.86 |
|  | W | 0.0 | 0.0 | 0.00 | 0.00 | 0.00 | 1.00 | 2.00 | 1.00 | 1.00 |

| A | B | X3 S3 | C3 | RG3 | P4 | X4 S4 | C4 | RG4 | P5 |
|---|---|---|---|---|---|---|---|---|---|
| F1 | N | −0.11 | 0.37 | 0.63 | 1.17 | 0.20 | 0.00 | −0.11 | −0.51 |
|  | W | 2.39 | 4.77 | 2.39 | 2.39 | 2.57 | 5.15 | 2.57 | 2.57 |
| F2 | N | 0.0 | 0.43 | 0.67 | 1.05 | 0.28 | 0.10 | 0.0 | −0.46 |
|  | W | 2.39 | 4.77 | 2.39 | 2.39 | 0.0 | 0.0 | 0.0 | 0.0 |
| F3 | N | −0.18 | 0.58 | 1.00 | 1.84 | 0.31 | 0.00 | −0.18 | −0.81 |
|  | W | 1.00 | 2.00 | 1.00 | 1.00 | 1.40 | 2.79 | 1.40 | 1.40 |
| F4 | N | 0.0 | 0.65 | 1.00 | 1.57 | 0.42 | 0.15 | 0.0 | −0.69 |
|  | W | 1.00 | 2.00 | 1.00 | 1.00 | 0.0 | 0.0 | 0.0 | 0.0 |
| F5 | N | −0.30 | 1.00 | 1.71 | 3.16 | 0.54 | 0.00 | −0.30 | −1.38 |
|  | W | 0.00 | 1.00 | 0.00 | 0.00 | 0.55 | 1.10 | 0.55 | 0.55 |
| F6 | N | 0.0 | 1.00 | 1.55 | 2.42 | 0.65 | 0.23 | 0.0 | −1.06 |
|  | W | 0.00 | 0.00 | 0.00 | 0.00 | 0.0 | 0.0 | 0.0 | 0.0 |
| F8 | N | 1.76 | 1.00 | 0.58 | −1.85 | 1.27 | 1.59 | 1.76 | 0.81 |
|  | W | 0.51 | 1.02 | 0.51 | 0.51 | 0.0 | 0.0 | 0.0 | 0.0 |
| F9 | N | 3.04 | 1.72 | 1.00 | −3.19 | 2.19 | 2.73 | 3.04 | 1.40 |
|  | W | 0.30 | 0.59 | 0.30 | 0.30 | 0.0 | 0.0 | 0.0 | 0.0 |
| R1 | N | −0.76 | 0.00 | 0.42 | 1.85 | −0.27 | −0.59 | −0.76 | −0.81 |
|  | W | 2.39 | 4.77 | 2.39 | 2.39 | 0.0 | 0.0 | 0.0 | 0.0 |
| R2 | N | −1.82 | 0.00 | 1.00 | 4.42 | −0.65 | −1.40 | −1.82 | −1.94 |
|  | W | 1.00 | 2.00 | 1.00 | 1.00 | 0.0 | 0.0 | 0.0 | 0.0 |

Figure 3A:
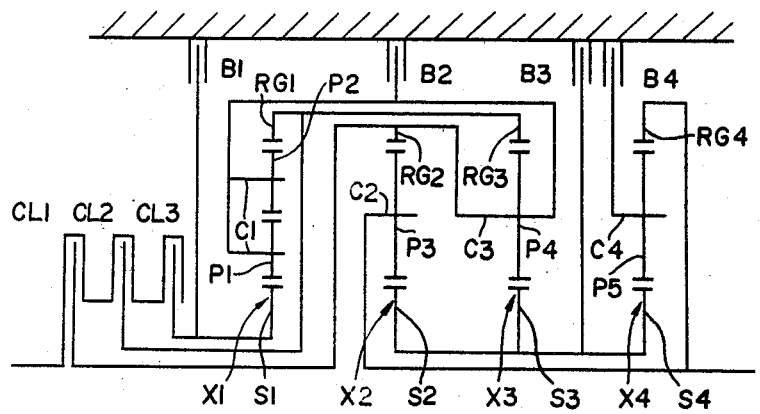
FIG. 3A is a schematic view similar to that of FIG. 1 showing however yet another embodiment of the present invention.

Referring now to FIG. 3A, yet another embodiment of the present invention is disclosed wherein the fourth planetary gear set $X_4$ of the single-pinion type includes a fourth sun gear $S_4$ drivingly engaged with the second and third sun gears $S_2$ and $S_3$ and being capable of being locked, together with the second and third sun gears $S_2$ and $S_3$, to the gear casing when the third brake $B_3$ is actuated. The fourth brake $B_4$ is interposed between the fourth carrier $C_4$ and the casing so as to be capable of locking the fourth carrier $C_4$ thereto when $B_4$ is actuated, and the ring gear $RG_4$ is connected to the output shaft. Within this embodiment, the radial ratio within each speed range is $I_4 = 0.562$ and Table 3B shows the relationship between the operation of the clutches and brakes with respect to the reduction gear ratios within each speed range while Table 3C shows the relationship regarding the number of revolutions and the tangential forces of the elements of the planetary gear sets within each speed range.

TABLE 3B

| | CL1 | CL2 | CL3 | B1 | B2 | B3 | B4 | Reduction gear ratio |
|---|---|---|---|---|---|---|---|---|
| F1 | | | O | | | | O | 1 : 8.15 |
| F2 | | O | | | | | O | 1 : 4.88 |
| F3 | | | O | | | O | | 1 : 3.57 |
| F4 | O | | | | | | O | 1 : 2.52 |
| F5 | | O | | | | O | | 1 : 2.40 |
| F6 | O | O | | | | O | | 1 : 1.55 |
| F7 | O | O | | | | | | 1 : 1.00 |
| F8 | | | | O | | | | 1 : 0.79 |
| F9 | | O | | O | | | | 1 : 0.46 |
| R1 | | | O | | O | | | 1 : −3.70 |
| R2 | | O | | | O | | | 1 : −1.55 |

TABLE 3C

| | B | X1 | | | | | X2 | | | |
|---|---|---|---|---|---|---|---|---|---|---|
| A | | S1 | C1 | RG1 | P1 | P2 | S2 | C2 | RG2 | P3 |
| F1 | N | 1.00 | 0.31 | 0.60 | −1.05 | 1.05 | −0.22 | 0.12 | 0.31 | 0.83 |
| | W | 2.39 | 4.77 | 2.39 | 2.39 | 2.39 | 2.31 | 4.62 | 2.31 | 2.31 |
| F2 | N | 1.67 | 0.52 | 1.00 | −1.76 | 1.76 | −0.36 | 0.20 | 0.52 | 1.38 |
| | W | 0.0 | 0.00 | 0.0 | 0.0 | 0.0 | 1.55 | 3.10 | 1.55 | 1.55 |
| F3 | N | 1.00 | 0.43 | 0.67 | −0.86 | 0.86 | 0.00 | 0.28 | 0.43 | 0.68 |
| | W | 2.39 | 4.77 | 2.39 | 2.39 | 2.39 | 2.31 | 4.62 | 2.31 | 2.31 |
| F4 | N | 3.23 | 1.00 | 1.93 | −3.40 | 3.40 | −0.71 | 0.40 | 1.00 | 2.67 |
| | W | 0.0 | 0.00 | 0.00 | 0.00 | 0.00 | 1.00 | 2.00 | 1.00 | 1.00 |
| F5 | N | 1.49 | 0.65 | 1.00 | −1.29 | 1.29 | 0.0 | 0.42 | 0.65 | 1.01 |
| | W | 0.0 | 0.00 | 0.00 | 0.00 | 0.00 | 1.55 | 3.10 | 1.55 | 1.55 |
| F6 | N | 2.31 | 1.00 | 1.55 | −1.99 | 1.99 | 0.0 | 0.65 | 1.00 | 1.57 |
| | W | 0.0 | 0.00 | 0.00 | 0.00 | 0.00 | 1.00 | 2.00 | 1.00 | 1.00 |
| F8 | N | 0.0 | 1.00 | 0.58 | 1.52 | −1.52 | 1.76 | 1.27 | 1.00 | −1.20 |
| | W | 0.51 | 1.02 | 0.51 | 0.51 | 0.51 | 0.51 | 1.02 | 0.51 | 0.51 |
| F9 | N | 0.0 | 1.72 | 1.00 | 2.62 | −2.62 | 3.04 | 2.19 | 1.72 | −2.06 |
| | W | 1.30 | 2.59 | 1.30 | 1.30 | 1.30 | 0.30 | 0.59 | 0.30 | 0.30 |
| R1 | N | 1.00 | 0.0 | 0.42 | −1.52 | 1.52 | −0.76 | −0.27 | 0.0 | 1.20 |
| | W | 2.39 | 4.77 | 2.39 | 2.39 | 2.39 | 2.39 | 4.77 | 2.39 | 2.39 |
| R2 | N | 2.39 | 0.0 | 1.00 | −3.64 | 3.64 | −1.82 | −0.65 | 0.0 | 2.86 |
| | W | 0.0 | 0.0 | 0.00 | 0.00 | 0.00 | 1.00 | 2.00 | 1.00 | 1.00 |

| | B | X3 | | | | X4 | | | |
|---|---|---|---|---|---|---|---|---|---|
| A | | S3 | C3 | RG3 | P4 | S4 | C4 | RG4 | P5 |
| F1 | N | −0.22 | 0.31 | 0.60 | 1.28 | −0.22 | −0.00 | 0.12 | 0.56 |
| | W | 2.39 | 4.77 | 2.39 | 2.39 | 4.58 | 9.16 | 4.58 | 4.58 |
| F2 | N | −0.36 | 0.52 | 1.00 | 2.14 | −0.36 | −0.00 | 0.20 | 0.94 |
| | W | 1.00 | 2.00 | 1.00 | 1.00 | 2.48 | 4.97 | 2.48 | 2.48 |
| F3 | N | 0.0 | 0.43 | 0.67 | 1.05 | 0.0 | 0.18 | 0.23 | 0.46 |
| | W | 2.39 | 4.77 | 2.39 | 2.39 | 0.0 | 0.0 | 0.0 | 0.0 |
| F4 | N | −0.71 | 1.00 | 1.93 | 4.13 | −0.71 | 0.0 | 0.40 | 1.81 |
| | W | 0.00 | 0.00 | 0.00 | 0.00 | 0.98 | 1.95 | 0.98 | 0.98 |
| F5 | N | 0.0 | 0.65 | 1.00 | 1.57 | 0.0 | 0.27 | 0.42 | 0.69 |
| | W | 1.00 | 2.00 | 1.00 | 1.00 | 0.0 | 0.0 | 0.0 | 0.0 |
| F6 | N | 0.0 | 1.00 | 1.55 | 2.42 | 0.0 | 0.41 | 0.65 | 1.06 |
| | W | 0.00 | 0.00 | 0.00 | 0.00 | 0.0 | 0.0 | 0.0 | 0.0 |
| F8 | N | 1.76 | 1.00 | 0.58 | −1.85 | 1.76 | 1.45 | 1.27 | −0.81 |
| | W | 0.51 | 1.02 | 0.51 | 0.51 | 0.00 | 0.0 | 0.0 | 0.0 |
| F9 | N | 3.04 | 1.72 | 1.00 | −3.19 | 3.04 | 2.49 | 2.19 | −1.40 |
| | W | 0.30 | 0.59 | 0.30 | 0.30 | 0.00 | 0.0 | 0.0 | 0.0 |
| R1 | N | −0.76 | 0.00 | 0.42 | 1.85 | −0.76 | −0.45 | −0.27 | 0.81 |
| | W | 2.39 | 4.77 | 2.39 | 2.39 | 0.00 | 0.0 | 0.0 | 0.0 |
| R2 | N | −1.82 | 0.00 | 1.00 | 4.42 | −1.82 | −1.07 | −0.65 | 1.94 |
| | W | 1.00 | 2.00 | 1.00 | 1.00 | 0.00 | 0.0 | 0.0 | 0.0 |

Figure 4A:
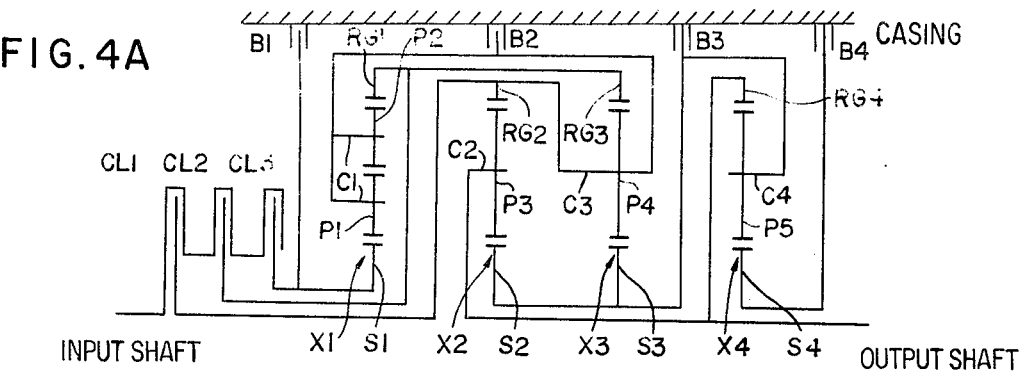
FIG. 4A is a schematic view similar to that of FIG. 1 showing however still another embodiment of the present invention.

A fourth embodiment of a speed change gear system constructed in accordance with the present invention is illustrated within FIG. 4A and includes a fourth planetary gear set $X_4$ of the single-pinion type interposed between the third planetary gear set $X_3$ and the output shaft, the fourth carrier $C_4$ being drivingly engaged with the second and third sun gears $S_2$ and $S_3$ so as to be capable of being locked to the gear casing when the third brake $B_3$ is actuated. The fourth brake $B_4$ is disposed between the fourth sun gears $S_4$ and the casing so as to be capable of locking the fourth sun gear $S_4$ thereto when the brake $B_4$ is actuated, and the fourth ring gear $RG_4$ is drivingly engaged with the second carrier $C_2$ through means of the output shaft. Within this embodiment, the radial ratio within each speed range is $I_4 = 0.562$, and Table 4B shows the relationship between the operation of the clutches and brakes with respect to the reduction gear ratio within each speed range while Table 4C shows the relationship regarding the number of revolutions and the tangential forces of all of the embodiments of the planetary gear sets within each speed range.

TABLE 4B

| | CL1 | CL2 | CL3 | B1 | B2 | B3 | B4 | Reduction gear ratio |
|---|---|---|---|---|---|---|---|---|
| F1 | | | O | | | | O | 1 : 3.57 |
| F2 | | O | | | | | O | 1 : 2.40 |
| F3 | | | O | | | O | | 1 : 1.93 |
| F4 | O | | | | | | O | 1 : 1.55 |
| F5 | | O | | | | O | | 1 : 1.52 |
| F6 | O | | | | | O | | 1 : 1.20 |
| F7 | O | O | | | | | | 1 : 1.00 |
| F8 | O | | | | O | | | 1 : 0.79 |
| R1 | | | O | | O | | | 1 : −3.70 |
| R2 | | O | | | O | | | 1 : −1.55 |

TABLE 4C

| | B | X1 | | | | | X2 | | | |
|---|---|---|---|---|---|---|---|---|---|---|
| A | | S1 | C1 | RG1 | P1 | P2 | S2 | C2 | RG2 | P3 |
| F1 | N | 1.00 | 0.43 | 0.67 | −0.86 | 0.86 | 0.0 | 0.28 | 0.43 | 0.68 |
| | W | 2.39 | 4.77 | 2.39 | 2.39 | 2.39 | 2.31 | 4.62 | 2.31 | 2.31 |
| F2 | N | 1.49 | 0.65 | 1.00 | −1.29 | 1.29 | 0.0 | 0.42 | 0.65 | 1.01 |

TABLE 4C-continued

|   |   | S3 | C3 | RG3 | P4 | S4 | C4 | RG4 | P5 |
|---|---|---|---|---|---|---|---|---|---|
|   | W | 0.0 | 0.0 | 0.00 | 0.00 | 0.00 | 1.55 | 3.10 | 1.55 | 1.55 |
| F3 | N | 1.00 | 0.62 | 0.78 | −0.58 | 0.58 | 0.33 | 0.52 | 0.62 | 0.45 |
|   | W | 2.39 | 4.77 | 2.39 | 2.39 | 2.39 | 2.31 | 4.62 | 2.31 | 2.31 |
| F4 | N | 2.31 | 1.00 | 1.55 | −1.99 | 1.99 | 0.0 | 0.65 | 1.00 | 1.57 |
|   | W | 0.0 | 0.00 | 0.00 | 0.00 | 0.00 | 1.00 | 2.00 | 1.00 | 1.00 |
| F5 | N | 1.28 | 0.80 | 1.00 | −0.74 | 0.74 | 0.43 | 0.67 | 0.80 | 0.58 |
|   | W | 0.0 | 0.00 | 0.00 | 0.00 | 0.00 | 1.55 | 3.10 | 1.55 | 1.55 |
| F6 | N | 1.61 | 1.00 | 1.25 | −0.93 | 0.93 | 0.53 | 0.84 | 1.00 | 0.73 |
|   | W | 0.0 | 0.00 | 0.00 | 0.00 | 0.00 | 1.00 | 2.00 | 1.00 | 1.00 |
| F8 | N | 0.0 | 1.00 | 0.58 | 1.52 | −1.52 | 1.76 | 1.27 | 1.00 | −1.20 |
|   | W | 0.51 | 1.02 | 0.51 | 0.51 | 0.51 | 0.51 | 1.02 | 0.51 | 0.51 |
| R1 | N | 1.00 | 0.0 | 0.42 | −1.52 | 1.52 | −0.76 | −0.27 | 0.0 | 1.20 |
|   | W | 2.39 | 4.77 | 2.39 | 2.39 | 2.39 | 2.39 | 4.77 | 2.39 | 2.39 |
| R2 | N | 2.39 | 0.0 | 1.00 | −3.64 | 3.64 | −1.82 | −0.65 | 0.0 | 2.86 |
|   | W | 0.0 | 0.00 | 0.00 | 0.00 | 0.00 | 1.00 | 2.00 | 1.00 | 1.00 |

|   | B |   | X3 |   |   |   | X4 |   |   |
|---|---|---|---|---|---|---|---|---|---|
| A |   | S3 | C3 | RG3 | P4 | S4 | C4 | RG4 | P5 |
| F1 | N | 0.0 | 0.43 | 0.67 | 1.05 | −0.50 | 0.0 | 0.28 | 1.28 |
|   | W | 2.39 | 4.77 | 2.39 | 2.39 | 0.0 | 0.00 | 0.00 | 0.00 |
| F2 | N | 0.0 | 0.65 | 1.00 | 1.57 | −0.74 | 0.0 | 0.42 | 1.91 |
|   | W | 1.00 | 2.00 | 1.00 | 1.00 | 0.0 | 0.00 | 0.00 | 0.00 |
| F3 | N | 0.33 | 0.62 | 0.78 | 0.70 | 0.0 | 0.33 | 0.52 | 0.85 |
|   | W | 2.39 | 4.77 | 2.39 | 2.39 | 1.65 | 3.29 | 1.65 | 1.65 |
| F4 | N | 0.0 | 1.00 | 1.55 | 2.42 | −1.15 | 0.0 | 0.65 | 2.95 |
|   | W | 0.00 | 0.00 | 0.00 | 0.00 | 0.0 | 0.00 | 0.00 | 0.00 |
| F5 | N | 0.43 | 0.80 | 1.00 | 0.90 | 0.0 | 0.43 | 0.67 | 1.09 |
|   | W | 1.00 | 2.00 | 1.00 | 1.00 | 0.89 | 1.79 | 0.89 | 0.89 |
| F6 | N | 0.53 | 1.00 | 1.25 | 1.13 | 0.0 | 0.53 | 0.84 | 1.37 |
|   | W | 0.00 | 0.00 | 0.00 | 0.00 | 0.35 | 0.70 | 0.35 | 0.35 |
| F8 | N | 1.76 | 1.00 | 0.58 | −1.85 | 2.64 | 1.76 | 1.27 | −2.26 |
|   | W | 0.51 | 1.02 | 0.51 | 0.51 | 0.0 | 0.00 | 0.00 | 0.00 |
| R1 | N | −0.76 | 0.00 | 0.42 | 1.85 | −1.64 | −0.76 | −0.27 | 2.26 |
|   | W | 2.39 | 4.77 | 2.39 | 2.39 | 0.0 | 0.0 | 0.0 | 0.0 |
| R2 | N | −1.82 | 0.00 | 1.00 | 4.42 | −3.92 | −1.82 | −0.65 | 5.38 |
|   | W | 1.00 | 2.00 | 1.00 | 1.00 | 0.0 | 0.00 | 0.0 | 0.0 |

Figure 5A:
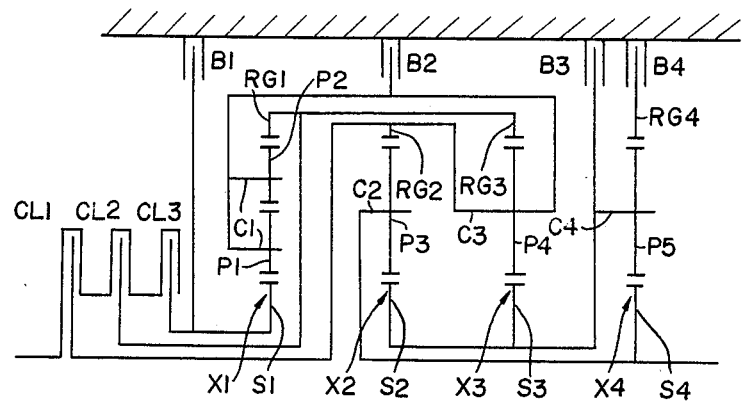
FIG. 5A is a schematic view similar to that of FIG. 1 showing yet still another embodiment of the present invention.

Referring now to FIG. 5A, a further embodiment of the invention is disclosed wherein the fourth planetary gear set $X_4$ of the single-pinion type is disposed between the third planetary gear set $X_3$ and the output shaft and wherein further the fourth carrier $C_4$ is drivingly engaged with the second and third sun gears $S_2$ and $S_3$ so as to capable of being locked in conjunction with the second and third sun gears $S_2$ and $S_3$ to the gear casing when the third brake $B_3$ is actuated. A fourth brake $B_4$ is disposed between the fourth ring gear $RG_4$ and the casing so as to be capable of locking the fourth ring gear $RG_4$ thereto when the brake $B_4$ is actuated and the fourth sun gear $S_4$ is drivingly engaged with the second carrier $C_2$ through means of the output shaft. Within this embodiment, the radial ratio within each speed range is $I_4 = 0.562$ and Table 5B shows the relationship between the operation of the clutches and brakes with respect to the reduction gear ratio within each speed range while Table 5C shows the relationship regarding the number of revolutions and the tangential forces of the elements within the planetary gear sets within each speed range.

TABLE 5B

|   | CL1 | CL2 | CL3 | B1 | B2 | B3 | B4 | Reduction gear ratio |
|---|---|---|---|---|---|---|---|---|
| F1 |   |   | O |   |   | O |   | 1 : 3.57 |
| F2 |   |   | O |   |   |   | O | 1 : 2.65 |
| F3 |   | O |   |   |   | O |   | 1 : 2.40 |
| F4 |   | O |   |   |   |   | O | 1 : 1.89 |
| F5 | O |   |   |   |   | O |   | 1 : 1.55 |
| F6 | O |   |   |   |   |   | O | 1 : 1.35 |
| F7 | O | O |   |   |   |   |   | 1 : 1.00 |
| F8 | O |   |   | O |   |   |   | 1 : 0.79 |
| F9 |   | O | O | O |   |   |   | 1 : 0.46 |
| R1 |   |   | O |   | O |   |   | 1 : −3.70 |
| R2 |   | O |   |   | O |   |   | 1 : −1.55 |

TABLE 5C

|   | B |   | X1 |   |   |   | X2 |   |   |
|---|---|---|---|---|---|---|---|---|---|
| A |   | S1 | C1 | RG1 | P1 | P2 | S2 | C2 | RG2 | P3 |
| F1 | N | 1.00 | 0.43 | 0.67 | −0.86 | 0.86 | 0.0 | 0.28 | 0.43 | 0.68 |
|   | W | 2.39 | 4.77 | 2.39 | 2.39 | 2.39 | 2.31 | 4.62 | 2.31 | 2.31 |
| F2 | N | 1.00 | 0.51 | 0.72 | −0.75 | 0.75 | 0.14 | 0.38 | 0.51 | 0.59 |
|   | W | 2.39 | 4.77 | 2.39 | 2.39 | 2.39 | 2.31 | 4.62 | 2.31 | 2.31 |
| F3 | N | 1.49 | 0.65 | 1.00 | −1.29 | 1.29 | 0.00 | 0.42 | 0.65 | 1.01 |
|   | W | 0.0 | 0.00 | 0.00 | 0.00 | 0.00 | 1.55 | 3.10 | 1.55 | 1.55 |
| F4 | N | 1.40 | 0.71 | 1.00 | −1.04 | 1.04 | 0.19 | 0.53 | 0.71 | 0.82 |
|   | W | 0.0 | 0.00 | 0.00 | 0.00 | 0.00 | 1.55 | 3.10 | 1.55 | 1.55 |
| F5 | N | 2.31 | 1.00 | 1.55 | −1.99 | 1.99 | 0.00 | 0.65 | 1.00 | 1.57 |
|   | W | 0.00 | 0.00 | 0.00 | 0.00 | 0.00 | 1.00 | 2.00 | 1.00 | 1.00 |
| F6 | N | 1.96 | 1.00 | 1.40 | −1.46 | 1.46 | 0.27 | 0.74 | 1.00 | 1.15 |
|   | W | 0.0 | 0.00 | 0.00 | 0.00 | 0.00 | 1.00 | 2.00 | 1.00 | 1.00 |
| F8 | N | 0.0 | 1.00 | 0.58 | 1.52 | −1.52 | 1.76 | 1.27 | 1.00 | −1.20 |
|   | W | 0.51 | 1.02 | 0.51 | 0.51 | 0.51 | 0.51 | 1.02 | 0.51 | 0.51 |
| F9 | N | 0.0 | 1.72 | 1.00 | 2.62 | 2.62 | 3.04 | 2.19 | 1.72 | −2.06 |
|   | W | 1.30 | 2.59 | 1.30 | 1.30 | 1.30 | 0.30 | 0.59 | 0.30 | 0.30 |
| R1 | N | 1.00 | 0.0 | 0.42 | −1.52 | 1.52 | −0.76 | −0.27 | 0.0 | 1.20 |
|   | W | 2.39 | 4.77 | 2.39 | 2.39 | 2.39 | 2.39 | 4.77 | 2.39 | 2.39 |
| R2 | N | 2.39 | 0.0 | 1.00 | −3.64 | 3.64 | −1.82 | −0.65 | 0.0 | 2.86 |
|   | W | 0.0 | 0.00 | 0.0 | 0.0 | 0.0 | 1.00 | 2.00 | 1.00 | 1.00 |
|   | B |   | X3 |   |   |   | X4 |   |   |

TABLE 5C-continued

| A | | S3 | C3 | RG3 | P4 | S4 | C4 | RG4 | P5 |
|---|---|---|---|---|---|---|---|---|---|
| F1 | N | 0.0 | 0.43 | 0.67 | 1.05 | 0.28 | 0.00 | −0.16 | −0.72 |
| | W | 2.39 | 4.77 | 2.39 | 2.39 | 0.00 | 0.00 | 0.00 | 0.00 |
| F2 | N | 0.14 | 0.51 | 0.72 | 0.91 | 0.38 | 0.14 | 0.0 | −0.62 |
| | W | 2.39 | 4.77 | 2.39 | 2.39 | 1.65 | 3.29 | 1.65 | 1.65 |
| F3 | N | 0.00 | 0.65 | 1.00 | 1.57 | 0.42 | 0.00 | −0.23 | −1.07 |
| | W | 1.00 | 2.00 | 1.00 | 1.00 | 0.00 | 0.00 | 0.00 | 0.00 |
| F4 | N | 0.19 | 0.71 | 1.00 | 1.27 | 0.53 | 0.19 | 0.0 | −0.87 |
| | W | 1.00 | 2.00 | 1.00 | 1.00 | 0.89 | 1.79 | 0.89 | 0.89 |
| F5 | N | 0.00 | 1.00 | 1.55 | 2.42 | 0.65 | 0.00 | −0.36 | −1.66 |
| | W | 0.00 | 0.00 | 0.00 | 0.00 | 0.00 | 0.00 | 0.00 | 0.00 |
| F6 | N | 0.27 | 1.00 | 1.40 | 1.78 | 0.74 | 0.27 | 0.0 | −1.22 |
| | W | 0.00 | 0.00 | 0.00 | 0.00 | 0.35 | 0.70 | 0.35 | 0.35 |
| F8 | N | 1.76 | 1.00 | 0.58 | −1.85 | 1.27 | 1.76 | 2.04 | 1.27 |
| | W | 0.51 | 1.02 | 0.51 | 0.51 | 0.00 | 0.00 | 0.00 | 0.00 |
| F9 | N | 3.04 | 1.72 | 1.00 | −3.19 | 2.19 | 3.04 | 3.51 | 2.18 |
| | W | 0.30 | 0.59 | 0.30 | 0.30 | 0.00 | 0.00 | 0.00 | 0.00 |
| R1 | N | −0.76 | 0.00 | 0.42 | 1.85 | −0.27 | −0.76 | −1.04 | −1.27 |
| | W | 2.39 | 4.77 | 2.39 | 2.39 | 0.0 | 0.0 | 0.0 | 0.0 |
| R2 | N | −1.82 | 0.00 | 1.00 | 4.42 | −0.65 | −1.82 | −2.49 | −3.03 |
| | W | 1.00 | 2.00 | 1.00 | 1.00 | 0.0 | 0.0 | 0.0 | 0.0 |

Figure 6A:
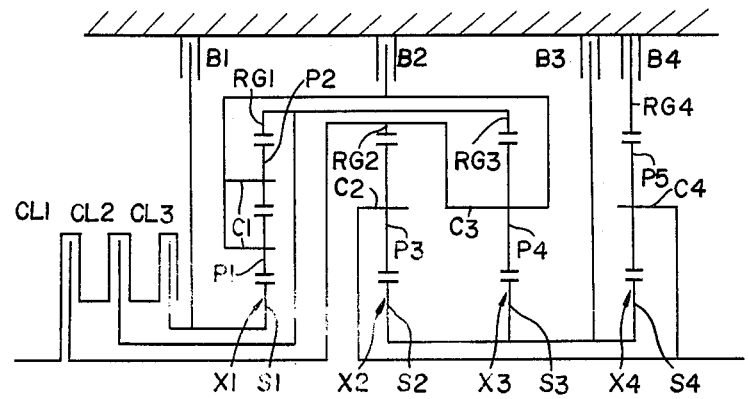
FIG. 6A is a schematic view similar to that of FIG. 1 showing however a further embodiment of the present invention.

Turning now to the embodiment illustrated within FIG. 6A, the fourth planetary gear set $X_4$ of the single-pinion type is disposed between the third planetary gear set $X_3$ and the output shaft and includes the fourth sun gear $S_4$ drivingly engaged with the second and third sun gears $S_2$ and $S_3$ so as to be capable of being locked therewith to the gear casing when the third brake $B_3$ is actuated. The fourth brake $B_4$ is disposed between the fourth ring gear $RG_4$ and the casing so as to be capable of locking the fourth ring gear $RG_4$ when the brake $B_4$ is actuated and the fourth carrier $C_4$ is drivingly engaged with the second carrier $C_2$ through means of the output shaft. Within this embodiment, the radial ratio within each speed range is $I_4 = 0.437$ and Table 6B shows the relationship between the operation of the clutches and brakes with respect to the reduction gear ratio within each speed range while Table 6C shows the relationship regarding the number of revolutions and the tangential forces of the elements of the planetary gear sets within each speed range.

TABLE 6B

| | CL1 | CL2 | CL3 | B1 | B2 | B3 | B4 | Reduction gear ratio |
|---|---|---|---|---|---|---|---|---|
| F1 | | | o | | | o | | 1 : 3.57 |
| F2 | | o | | | | o | | 1 : 2.40 |
| F3 | o | | | | | o | | 1 : 1.55 |
| F4 | o | o | | | | | | 1 : 1.00 |
| F5 | o | | | | o | | | 1 : 0.79 |
| F6 | | o | | | o | | | 1 : 0.46 |
| R1 | | | | o | | | o | 1 : −4.89 |
| R2 | | | o | | o | | | 1 : −3.70 |
| R3 | | | o | | | | o | 1 : −2.20 |
| R4 | | | o | | | o | | 1 : −1.55 |

TABLE 6C

| B | | X1 | | | | | X2 | | | |
|---|---|---|---|---|---|---|---|---|---|---|
| A | | S1 | C1 | RG1 | P1 | P2 | S2 | C2 | RG2 | P3 |
| F1 | N | 1.00 | 0.43 | 0.67 | −0.86 | 0.86 | 0.0 | 0.28 | 0.43 | 0.68 |
| | W | 2.39 | 4.77 | 2.39 | 2.39 | 2.39 | 2.31 | 4.62 | 2.31 | 2.31 |
| F2 | N | 1.49 | 0.65 | 1.00 | −1.29 | 1.29 | 0.0 | 0.42 | 0.55 | 1.01 |
| | W | 0.0 | 0.00 | 0.00 | 0.00 | 0.00 | 1.55 | 3.10 | 1.55 | 1.55 |
| F3 | N | 2.31 | 1.00 | 1.55 | −1.99 | 1.99 | 0.0 | 0.65 | 1.00 | 1.57 |
| | W | 0.0 | 0.00 | 0.00 | 0.00 | 0.00 | 1.00 | 2.00 | 1.00 | 1.00 |
| F5 | N | 0.0 | 1.00 | 0.58 | 1.52 | −1.52 | 1.76 | 1.27 | 1.00 | −1.20 |
| | W | 0.51 | 1.02 | 0.51 | 0.51 | 0.51 | 0.51 | 1.02 | 0.51 | 0.51 |
| F6 | N | 0.0 | 1.72 | 1.00 | 2.62 | −2.62 | 3.04 | 2.19 | 1.72 | −2.06 |
| | W | 1.30 | 2.59 | 1.30 | 1.30 | 1.30 | 0.30 | 0.59 | 0.30 | 0.30 |
| R1 | N | 1.00 | 0.05 | 0.45 | −1.44 | 1.44 | −0.67 | 0.20 | 0.05 | 1.14 |
| | W | 2.39 | 4.77 | 2.39 | 2.39 | 2.39 | 2.31 | 4.62 | 2.31 | 2.31 |
| R2 | N | 1.00 | 0.0 | 0.42 | −1.52 | 1.52 | −0.76 | −0.27 | 0.0 | 1.20 |
| | W | 2.39 | 4.77 | 2.39 | 2.39 | 2.39 | 2.39 | 4.77 | 2.39 | 2.39 |
| R3 | N | 2.23 | 0.12 | 1.00 | −3.22 | 3.22 | −1.50 | −0.46 | 0.12 | 2.53 |
| | W | 0.0 | 0.0 | 0.00 | 0.00 | 0.00 | 1.55 | 3.10 | 1.55 | 1.55 |
| R4 | N | 2.39 | 0.0 | 1.00 | −3.64 | 3.64 | −1.82 | −0.65 | 0.0 | 2.86 |
| | W | 0.0 | 0.0 | 0.00 | 0.00 | 0.00 | 1.00 | 2.00 | 1.00 | 1.00 |

| B | | X3 | | | | X4 | | | |
|---|---|---|---|---|---|---|---|---|---|
| A | | S3 | C3 | RG3 | P4 | S4 | C4 | RG4 | P5 |
| F1 | N | 0.0 | 0.43 | 0.67 | 1.05 | 0.0 | 0.28 | 0.40 | 0.43 |
| | W | 2.39 | 4.77 | 2.39 | 2.39 | 0.0 | 0.0 | 0.0 | 0.0 |
| F2 | N | 0.0 | 0.65 | 1.00 | 1.57 | 0.0 | 0.42 | 0.60 | 0.65 |
| | W | 1.00 | 2.00 | 1.00 | 1.00 | 0.0 | 0.0 | 0.0 | 0.0 |
| F3 | N | 0.0 | 1.00 | 1.55 | 2.42 | 0.0 | 0.65 | 0.93 | 1.00 |
| | W | 0.00 | 0.00 | 0.00 | 0.00 | 0.0 | 0.0 | 0.0 | 0.0 |
| F5 | N | 1.76 | 1.00 | 0.58 | −1.85 | 1.76 | 1.27 | 1.05 | −0.77 |
| | W | 0.51 | 1.02 | 0.51 | 0.51 | 0.00 | 0.0 | 0.0 | 0.0 |
| F6 | N | 3.04 | 1.72 | 1.00 | −3.19 | 3.04 | 2.19 | 1.82 | −1.32 |
| | W | 0.30 | 0.59 | 0.30 | 0.30 | 0.00 | 0.0 | 0.0 | 0.0 |
| R1 | N | −0.67 | 0.05 | 0.45 | 1.76 | −0.67 | −0.20 | 0.00 | 0.73 |
| | W | 2.39 | 4.77 | 2.39 | 2.39 | 5.89 | 11.77 | 5.89 | 5.89 |
| R2 | N | −0.76 | −0.00 | 0.42 | 1.85 | −0.76 | −0.27 | −0.05 | 0.77 |
| | W | 2.39 | 4.77 | 2.39 | 2.39 | 0.00 | 0.0 | 0.0 | 0.0 |
| R3 | N | −1.50 | 0.12 | 1.00 | 3.91 | −1.50 | −0.46 | 0.00 | 1.62 |
| | W | 1.00 | 2.00 | 1.00 | 1.00 | 3.20 | 6.39 | 3.20 | 3.20 |

TABLE 6C-continued

| | | | | | | | | | |
|---|---|---|---|---|---|---|---|---|---|
| R4 | N | −1.82 | −0.00 | 1.00 | 4.42 | −1.82 | −0.65 | −0.13 | 1.83 |
|    | W | 1.00  | 2.00  | 1.00 | 1.00 | 0.00  | 0.0   | 0.0   | 0.0  |

Figure 7A:
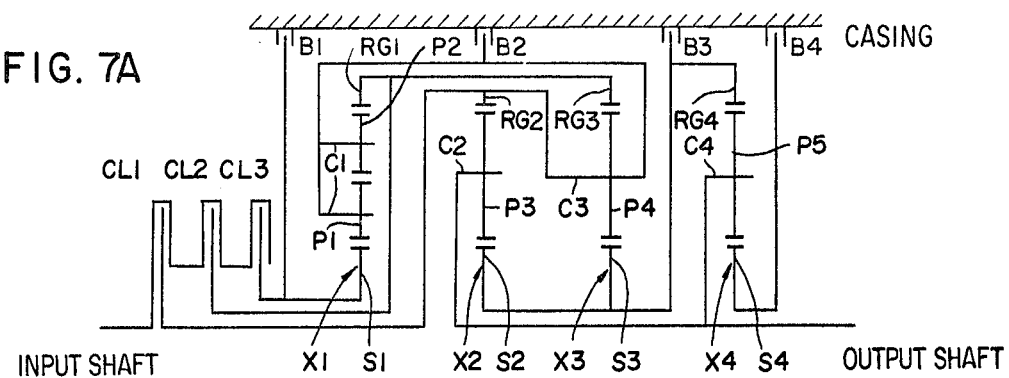
FIG. 7A is a schematic view similar to that of FIG. 1 showing however a yet further embodiment of the present invention.

Referring now to the embodiment of the invention illustrated within FIG. 7A, the fourth planetary gear set $X_4$ of the single-pinion type is disposed between the third planetary gear set $X_3$ and the output shaft and includes the fourth ring gear $RG_4$ drivingly engaged with the second and third sun gears $S_2$ and $S_3$ so as to be capable of being locked therewith when the third brake $B_3$ is actuated. The fourth brake $B_4$ is disposed between the fourth sun gear $S_4$ and the casing so as to be capable of locking the fourth sun gear $S_4$ when the brake $B_4$ is actuated, and the fourth carrier $C_4$ is drivingly engaged with the second carrier $C_2$ through means of the output shaft. Within this embodiment, the radial ratio within each speed range is $I_4 = 0.562$ and Table 7B shows the relationship between the operation of the clutches and brakes with respect to the reduction gear ratio within each speed range while Table 7C shows the relationship regarding the number of revolutions and the tangential forces of all of the elements of the planetary gear sets within each speed range.

TABLE 7B

| | CL1 | CL2 | CL3 | B1 | B2 | B3 | B4 | Reduction gear ratio |
|---|---|---|---|---|---|---|---|---|
| F1 |   |   |   | O |   |   | O | 1 : 3.57 |
| F2 |   | O |   |   |   |   | O | 1 : 2.40 |
| F3 | O |   |   |   |   |   | O | 1 : 1.55 |
| F4 | O | O |   |   |   |   |   | 1 : 1.00 |
| F5 | O |   |   |   |   | O |   | 1 : 0.79 |
| F6 | O |   |   |   |   |   | O | 1 : 0.69 |

TABLE 7B-continued

| | CL1 | CL2 | CL3 | B1 | B2 | B3 | B4 | Reduction gear ratio |
|---|---|---|---|---|---|---|---|---|
| F7 |   |   | O |   |   | O |   | 1 : 0.46 |
| R1 |   |   |   |   | O |   | O | 1 : −3.70 |
| R2 |   | O |   |   | O |   |   | 1 : −1.55 |
| R3 |   |   | O |   |   |   | O | 1 : −0.45 |

TABLE 7C

| A | B | X1 S1 | C1 | RG1 | P1 | P2 | X2 S2 | C2 | RG2 | P3 |
|---|---|---|---|---|---|---|---|---|---|---|
| F1 | N | 1.00 | 0.43 | 0.67 | −0.86 | 0.86 | 0.0 | 0.28 | 0.43 | 0.68 |
|    | W | 2.39 | 4.77 | 2.39 | 2.39 | 2.39 | 2.31 | 4.62 | 2.31 | 2.31 |
| F2 | N | 1.49 | 0.65 | 1.00 | −1.29 | 1.29 | 0.0 | 0.42 | 0.65 | 1.01 |
|    | W | 0.0 | 0.00 | 0.00 | 0.00 | 0.00 | 1.55 | 3.10 | 1.55 | 1.55 |
| F3 | N | 2.31 | 1.00 | 1.55 | −1.99 | 1.99 | 0.0 | 0.65 | 1.00 | 1.57 |
|    | W | 0.0 | 0.00 | 0.00 | 0.00 | 0.00 | 1.00 | 2.00 | 1.00 | 1.00 |
| F5 | N | 0.0 | 1.00 | 0.58 | 1.52 | −1.52 | 1.76 | 1.27 | 1.00 | −1.20 |
|    | W | 0.51 | 1.02 | 0.51 | 0.51 | 0.51 | 0.51 | 1.02 | 0.51 | 0.51 |
| F6 | N | −0.64 | 1.00 | 0.31 | 2.51 | −2.51 | 2.26 | 1.45 | 1.00 | −1.97 |
|    | W | 0.0 | 0.0 | 0.00 | 0.00 | 0.00 | 1.00 | 2.00 | 1.00 | 1.00 |
| F7 | N | 0.0 | 1.72 | 1.00 | 2.62 | −2.62 | 3.04 | 2.19 | 1.72 | −2.06 |
|    | W | 1.30 | 2.59 | 1.30 | 1.30 | 1.30 | 0.30 | 0.59 | 0.30 | 0.30 |
| R1 | N | 1.00 | 0.0 | 0.42 | −1.52 | 1.52 | −0.76 | −0.27 | 0.0 | 1.20 |
|    | W | 2.39 | 4.77 | 2.39 | 2.39 | 2.39 | 2.39 | 4.77 | 2.39 | 2.39 |
| R2 | N | 2.39 | 0.0 | 1.00 | −3.64 | 3.64 | −1.82 | −0.65 | 0.0 | 2.86 |
|    | W | 0.0 | 0.0 | 0.00 | 0.00 | 0.00 | 1.00 | 2.00 | 1.00 | 1.00 |
| R3 | N | 1.00 | −1.55 | −0.48 | −3.89 | 3.89 | −3.50 | −2.24 | −1.55 | 3.06 |
|    | W | 2.39 | 4.77 | 2.39 | 2.39 | 2.39 | 2.31 | 4.62 | 2.31 | 2.31 |

| A | B | X3 S3 | C3 | RG3 | P4 | X4 S4 | C4 | RG4 | P5 |
|---|---|---|---|---|---|---|---|---|---|
| F1 | N | 0.0 | 0.43 | 0.67 | 1.05 | 0.78 | 0.28 | 0.0 | −1.28 |
|    | W | 2.39 | 4.77 | 2.39 | 2.39 | 0.0 | 0.0 | 0.0 | 0.0 |
| F2 | N | 0.0 | 0.65 | 1.00 | 1.57 | 1.16 | 0.42 | 0.0 | −1.91 |
|    | W | 1.00 | 2.00 | 1.00 | 1.00 | 0.0 | 0.0 | 0.0 | 0.0 |
| F3 | N | 0.0 | 1.00 | 1.55 | 2.42 | 1.80 | 0.65 | 0.0 | −2.95 |
|    | W | 0.00 | 0.00 | 0.00 | 0.00 | 0.0 | 0.0 | 0.0 | 0.0 |
| F5 | N | 1.76 | 1.00 | 0.58 | −1.85 | 0.39 | 1.27 | 1.76 | 2.26 |
|    | W | 0.51 | 1.02 | 0.51 | 0.51 | 0.0 | 0.0 | 0.0 | 0.0 |
| F6 | N | 2.26 | 1.00 | 0.31 | −3.05 | 0.0 | 1.45 | 2.26 | 3.71 |
|    | W | 0.00 | 0.00 | 0.00 | 0.00 | 0.55 | 1.10 | 0.55 | 0.55 |
| F7 | N | 3.04 | 1.72 | 1.00 | −3.19 | 0.67 | 2.19 | 3.04 | 3.88 |
|    | W | 0.30 | 0.59 | 0.30 | 0.30 | 0.0 | 0.0 | 0.0 | 0.0 |
| R1 | N | −0.76 | 0.00 | 0.42 | 1.85 | −0.61 | −0.27 | −0.76 | −2.26 |
|    | W | 2.39 | 4.77 | 2.39 | 2.39 | 0.0 | 0.0 | 0.0 | 0.0 |
| R2 | N | −1.82 | 0.00 | 1.00 | 4.42 | 1.45 | −0.65 | −1.82 | −5.38 |
|    | W | 1.00 | 2.00 | 1.00 | 1.00 | 0.0 | 0.0 | 0.0 | 0.0 |
| R3 | N | −3.50 | −1.55 | −0.48 | 4.73 | 0.0 | −2.24 | −3.50 | −5.76 |
|    | W | 2.39 | 4.77 | 2.39 | 2.39 | 2.57 | 5.15 | 2.57 | 2.57 |

Figure 8A:
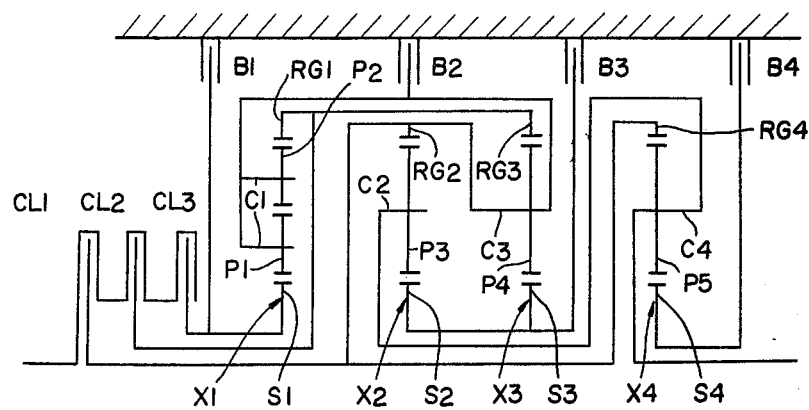
FIG. 8A is a schematic view similar to that of FIG. 1 showing however a still further embodiment of the present invention.

Referring now to FIG. 8A, still another embodiment of the present invention is disclosed wherein the fourth planetary gear set $X_4$ of the single-pinion type is disposed between the third planetary gear set $X_3$ and the output shaft and is seen to include the fourth ring gear $RG_4$ being drivingly engaged with the second ring gear $RG_2$, the third carrier $C_3$, and the first carrier $C_1$ through means of the intermediate shaft whereby such components may be locked to the gear casing when the second brake $B_2$ is actuated. Similarly, the fourth brake $B_4$ is disposed between the fourth sun gear $S_4$ and the casing so as to be capable of locking the fourth sun gear $S_4$ and the casing when the brake $B_4$ is actuated and the fourth carrier $C_4$ is drivingly engaged with the second carrier $C_2$ as well as with the output shaft. Within this embodiment, the radial ratio within each speed range is $I_4 = 0.280$ and Table 8B shows the relationship between the operation of the clutches and brakes and the reduction gear ratio within each speed range while Table 8C shows the relationship regarding the number of revolutions and the tangential forces of all of the elements of the planetary gear sets within each speed range.

TABLE 8B

|  | CL1 | CL2 | CL3 | B1 | B2 | B3 | B4 | Reduction gear ratio |
|---|---|---|---|---|---|---|---|---|
| F1 |  |  | O |  |  | O |  | 1 : 3.57 |
| F2 |  | O |  |  |  | O |  | 1 : 2.40 |
| F3 |  |  | O |  |  |  | O | 1 : 2.31 |
| F4 |  | O |  |  |  |  | O | 1 : 1.71 |
| F5 | O |  |  |  |  | O |  | 1 : 1.55 |
| F6 | O |  |  |  |  |  | O | 1 : 1.28 |
| F7 | O | O |  |  |  |  |  | 1 : 1.00 |
| F8 | O |  |  | O |  |  |  | 1 : 0.79 |
| F9 |  | O |  | O |  |  |  | 1 : 0.46 |
| R1 |  |  | O |  | O |  |  | 1 : −3.70 |
| R2 |  | O |  |  | O |  |  | 1 : −1.55 | fourth brake $B_4$ is disposed between the fourth ring gear $RG_4$ and the casing so as to be capable of locking the fourth ring gear $RG_4$ thereto when the brake $B_4$ is actuated and the fourth carrier $C_4$ is drivingly engaged with the second carrier $C_2$ as well as with the output shaft. Within this embodiment, the radial ratio within each speed range is $I_4 = 0.280$ and Table 9B shows the relationship between the operation of the clutches and brakes and the reduction gear ratio within each speed range while Table 9C shows the relationship regarding the number of revolutions and the tangential forces of all of the elements of the planetary gear sets within each speed range.

TABLE 9B

|  | CL1 | CL2 | CL3 | B1 | B2 | B3 | B4 | Reduction gear ratio |
|---|---|---|---|---|---|---|---|---|
| F1 |  |  | O |  |  |  | O | 1 : 17.77 |

TABLE 8C

| A | B | X1 | | | | | X2 | | | |
|---|---|---|---|---|---|---|---|---|---|---|
|  |  | S1 | C1 | RG1 | P1 | P2 | S2 | C2 | RG2 | P3 |
| F1 | N | 1.00 | 0.43 | 0.67 | −0.86 | 0.86 | 0.0 | 0.28 | 0.43 | 0.68 |
|  | W | 2.39 | 4.77 | 2.39 | 2.39 | 2.39 | 2.31 | 4.62 | 2.31 | 2.31 |
| F2 | N | 1.49 | 0.65 | 1.00 | −1.29 | 1.29 | 0.0 | 0.42 | 0.65 | 1.01 |
|  | W | 0.0 | 0.00 | 0.00 | 0.00 | 0.00 | 1.55 | 3.10 | 1.55 | 1.55 |
| F3 | N | 1.00 | 0.55 | 0.74 | −0.68 | 0.68 | 0.21 | 0.43 | 0.55 | 0.54 |
|  | W | 2.39 | 4.77 | 2.39 | 2.39 | 2.39 | 2.39 | 4.77 | 2.39 | 2.39 |
| F4 | N | 1.35 | 0.75 | 1.00 | −0.92 | 0.92 | 0.29 | 0.58 | 0.75 | 0.72 |
|  | W | 0.0 | 0.00 | 0.00 | 0.00 | 0.00 | 1.00 | 2.00 | 1.00 | 1.00 |
| F5 | N | 2.31 | 1.00 | 1.55 | −1.99 | 1.99 | 0.0 | 0.65 | 1.00 | 1.57 |
|  | W | 0.0 | 0.00 | 0.00 | 0.00 | 0.00 | 1.00 | 2.00 | 1.00 | 1.00 |
| F6 | N | 1.81 | 1.00 | 1.34 | −1.23 | 1.23 | 0.38 | 0.78 | 1.00 | 0.97 |
|  | W | 0.0 | 0.00 | 0.00 | 0.00 | 0.00 | 0.00 | 0.00 | 0.00 | 0.00 |
| F8 | N | 0.0 | 1.00 | 0.58 | 1.52 | −1.52 | 1.76 | 1.27 | 1.00 | −1.20 |
|  | W | 0.51 | 1.02 | 0.51 | 0.51 | 0.51 | 0.51 | 1.02 | 0.51 | 0.51 |
| F9 | N | 0.0 | 1.72 | 1.00 | 2.62 | −2.62 | 3.04 | 2.19 | 1.72 | −2.06 |
|  | W | 1.30 | 2.59 | 1.30 | 1.30 | 1.30 | 0.30 | 0.59 | 0.30 | 0.30 |
| R1 | N | 1.00 | 0.0 | 0.42 | −1.52 | 1.52 | −0.76 | −0.27 | 0.0 | 1.20 |
|  | W | 2.39 | 4.77 | 2.39 | 2.39 | 2.39 | 2.39 | 4.77 | 2.39 | 2.39 |
| R2 | N | 2.39 | 0.0 | 1.00 | −3.64 | 3.64 | −1.82 | −0.65 | 0.0 | 2.86 |
|  | W | 0.0 | 0.00 | 0.00 | 0.00 | 0.00 | 1.00 | 2.00 | 1.00 | 1.00 |

| A | B | X3 | | | | X4 | | | |
|---|---|---|---|---|---|---|---|---|---|
|  |  | S3 | C3 | RG3 | P4 | S4 | C4 | RG4 | P5 |
| F1 | N | 0.0 | 0.43 | 0.67 | 1.05 | −0.27 | 0.28 | 0.43 | 0.43 |
|  | W | 2.39 | 4.77 | 2.39 | 2.39 | 0.0 | 0.00 | 0.00 | 0.00 |
| F2 | N | 0.0 | 0.65 | 1.00 | 1.57 | −0.40 | 0.42 | 0.65 | 0.64 |
|  | W | 1.00 | 2.00 | 1.00 | 1.00 | 0.0 | 0.00 | 0.00 | 0.00 |
| F3 | N | 0.21 | 0.55 | 0.74 | 0.83 | 0.0 | 0.43 | 0.55 | 0.34 |
|  | W | 2.39 | 4.77 | 2.39 | 2.39 | 4.69 | 9.39 | 4.69 | 4.69 |
| F4 | N | 0.29 | 0.75 | 1.00 | 1.12 | 0.0 | 0.58 | 0.75 | 0.45 |
|  | W | 1.00 | 2.00 | 1.00 | 1.00 | 2.55 | 5.10 | 2.55 | 2.55 |
| F5 | N | 0.0 | 1.00 | 1.55 | 2.42 | −0.62 | 0.65 | 1.00 | 0.98 |
|  | W | 0.00 | 0.00 | 0.00 | 0.00 | 0.0 | 0.00 | 0.00 | 0.00 |
| F6 | N | 0.38 | 1.00 | 1.34 | 1.50 | 0.0 | 0.78 | 1.00 | 0.61 |
|  | W | 0.00 | 0.00 | 0.00 | 0.00 | 1.00 | 2.00 | 1.00 | 1.00 |
| F8 | N | 1.76 | 1.00 | 0.58 | −1.85 | 2.24 | 1.27 | 1.00 | −0.75 |
|  | W | 0.51 | 1.02 | 0.51 | 0.51 | 0.0 | 0.00 | 0.00 | 0.00 |
| F9 | N | 3.04 | 1.72 | 1.00 | −3.19 | 3.85 | 2.19 | 1.72 | −1.29 |
|  | W | 0.30 | 0.59 | 0.30 | 0.30 | 0.0 | 0.00 | 0.00 | 0.00 |
| R1 | N | −0.76 | 0.0 | 0.42 | 1.85 | −1.24 | −0.27 | 0.0 | 0.75 |
|  | W | 2.39 | 4.77 | 2.39 | 2.39 | 0.0 | 0.0 | 0.0 | 0.0 |
| R2 | N | −1.82 | 0.0 | 1.00 | 4.42 | −2.95 | −0.65 | 0.0 | 1.79 |
|  | W | 1.00 | 2.00 | 1.00 | 1.00 | 0.0 | 0.0 | 0.0 | 0.0 |

Figure 9A:
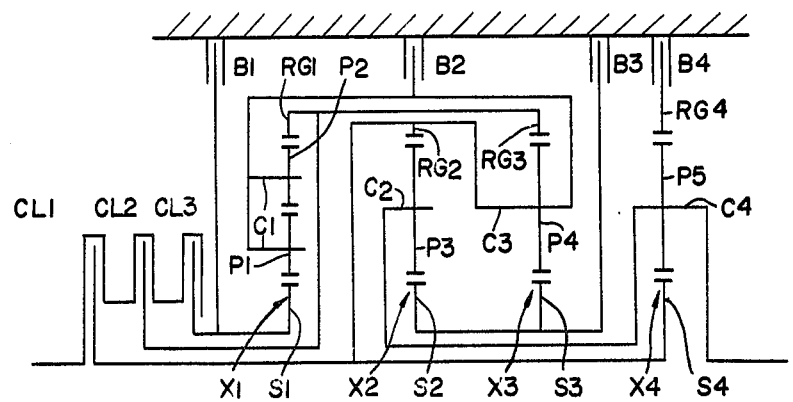
FIG. 9A is a schematic view similar to that of FIG. 1 showing however a yet still further embodiment of the present invention.

Turning now to FIG. 9A a still further embodiment of the present invention is illustrated wherein the fourth planetary gear set $X_4$ of the single-pinion type is disposed between the third planetary gear set $X_3$ and the output shaft and the fourth sun gear $S_4$ is drivingly engaged with the second ring gear $RG_2$, the third carrier $C_3$, and the first carrier $C_1$, through means of the intermediate shaft, such elements being locked to the gear casing when the second brake $B_2$ is actuated. The

|  | CL1 | CL2 | CL3 | B1 | B2 | B3 | B4 | Reduction gear ratio |
|---|---|---|---|---|---|---|---|---|
| F2 |  |  | O |  |  |  |  | 1 : 10.10 |
| F3 |  | O |  |  |  |  | O | 1 : 4.57 |
| F4 |  |  | O |  |  | O |  | 1 : 3.57 |
| F5 |  | O |  |  |  | O |  | 1 : 2.40 |
| F6 | O |  |  |  |  |  | O | 1 : 1.55 |
| F7 | O | O |  |  |  |  |  | 1 : 1.00 |
| F8 | O |  |  |  | O |  |  | 1 : 0.79 |
| F9 |  | O |  |  | O |  |  | 1 : 0.46 |
| R1 |  |  | O |  | O |  |  | 1 : −3.70 |
| R2 |  | O |  |  | O |  |  | 1 : −1.55 |

TABLE 9C

| B | X1 | X2 |
|---|---|---|

TABLE 9C-continued

| A | | S1 | C1 | RG1 | P1 | P2 | S2 | C2 | RG2 | P3 |
|---|---|------|------|------|-------|-------|-------|-------|------|-------|
| F1 | N | 1.00 | 0.26 | 0.57 | -1.13 | 1.13 | -0.31 | 0.06 | 0.26 | 0.89 |
|    | W | 2.39 | 4.77 | 2.39 | 2.39 | 2.39 | 2.39 | 4.77 | 2.39 | 2.39 |
| F2 | N | 1.76 | 0.45 | 1.00 | -1.99 | 1.99 | -0.55 | 0.10 | 0.45 | 1.56 |
|    | W | 0.0 | 0.00 | 0.0 | 0.0 | 0.0 | 1.00 | 2.00 | 1.00 | 1.00 |
| F3 | N | 3.89 | 1.00 | 2.21 | -4.40 | 4.40 | -1.21 | 0.22 | 1.00 | 3.46 |
|    | W | 0.0 | 0.00 | 0.00 | 0.00 | 0.00 | 0.00 | 0.00 | 0.00 | 0.00 |
| F4 | N | 1.00 | 0.43 | 0.67 | -0.86 | 0.86 | 0.0 | 0.28 | 0.43 | 0.68 |
|    | W | 2.39 | 4.77 | 2.39 | 2.39 | 2.39 | 2.31 | 4.62 | 2.31 | 2.31 |
| F5 | N | 1.49 | 0.65 | 1.00 | -1.29 | 1.29 | 0.0 | 0.42 | 0.65 | 1.01 |
|    | W | 0.0 | 0.00 | 0.00 | 0.00 | 0.00 | 1.55 | 3.10 | 1.55 | 1.55 |
| F6 | N | 2.31 | 1.00 | 1.55 | -1.99 | 1.99 | 0.0 | 0.65 | 1.00 | 1.57 |
|    | W | 0.0 | 0.00 | 0.00 | 0.00 | 0.00 | 1.00 | 2.00 | 1.00 | 1.00 |
| F8 | N | 0.0 | 1.00 | 0.58 | 1.52 | -1.52 | 1.76 | 1.27 | 1.00 | -1.20 |
|    | W | 0.51 | 1.02 | 0.51 | 0.51 | 0.51 | 0.51 | 1.02 | 0.51 | 0.51 |
| F9 | N | 0.0 | 1.72 | 1.00 | 2.62 | -2.62 | 3.04 | 2.19 | 1.72 | -2.06 |
|    | W | 1.30 | 2.59 | 1.30 | 1.30 | 1.30 | 0.30 | 0.59 | 0.30 | 0.30 |
| R1 | N | 1.00 | 0.0 | 0.42 | -1.52 | 1.52 | -0.76 | -0.27 | 0.0 | 1.20 |
|    | W | 2.39 | 4.77 | 2.39 | 2.39 | 2.39 | 2.39 | 4.77 | 2.39 | 2.39 |
| R2 | N | 2.39 | 0.0 | 1.00 | -3.64 | 3.64 | -1.82 | -0.65 | 0.0 | 2.86 |
|    | W | 0.0 | 0.0 | 0.00 | 0.00 | 0.00 | 1.00 | 2.00 | 1.00 | 1.00 |

| B | | X3 | | | | X4 | | | |
|---|---|------|------|------|-------|-------|-------|-------|-------|
| A | | S3 | C3 | RG3 | P4 | S4 | C4 | RG4 | P5 |
| F1 | N | -0.31 | 0.26 | 0.57 | 1.38 | 0.26 | 0.06 | 0.0 | -0.16 |
|    | W | 2.39 | 4.77 | 2.39 | 2.39 | 16.77 | 33.53 | 16.77 | 16.77 |
| F2 | N | -0.55 | 0.45 | 1.00 | 2.42 | 0.45 | 0.10 | 0.0 | -0.28 |
|    | W | 1.00 | 2.00 | 1.00 | 1.00 | 9.10 | 18.20 | 9.10 | 9.10 |
| F3 | N | -1.21 | 1.00 | 2.21 | 5.35 | 1.00 | 0.22 | 0.0 | -0.61 |
|    | W | 0.00 | 0.00 | 0.00 | 0.00 | 3.57 | 7.14 | 3.57 | 3.57 |
| F4 | N | 0.0 | 0.43 | 0.67 | 1.05 | 0.43 | 0.28 | 0.24 | -0.12 |
|    | W | 2.39 | 4.77 | 2.39 | 2.39 | 0.0 | 0.0 | 0.0 | 0.0 |
| F5 | N | 0.0 | 0.65 | 1.00 | 1.57 | 0.65 | 0.42 | 0.35 | -0.18 |
|    | W | 1.00 | 2.00 | 1.00 | 1.00 | 0.0 | 0.0 | 0.0 | 0.0 |
| F6 | N | 0.0 | 1.00 | 1.55 | 2.42 | 1.00 | 0.65 | 0.55 | -0.28 |
|    | W | 0.00 | 0.00 | 0.00 | 0.00 | 0.0 | 0.0 | 0.0 | 0.0 |
| F8 | N | 1.76 | 1.00 | 0.58 | -1.85 | 1.00 | 1.27 | 1.35 | 0.21 |
|    | W | 0.51 | 1.02 | 0.51 | 0.51 | 0.0 | 0.0 | 0.0 | 0.0 |
| F9 | N | 3.04 | 1.72 | 1.00 | -3.19 | 1.72 | 2.19 | 2.32 | 0.36 |
|    | W | 0.30 | 0.59 | 0.30 | 0.30 | 0.0 | 0.0 | 0.0 | 0.0 |
| R1 | N | -0.76 | 0.0 | 0.42 | 1.85 | 0.0 | -0.27 | -0.35 | -0.21 |
|    | W | 2.39 | 4.77 | 2.39 | 2.39 | 0.0 | 0.0 | 0.0 | 0.0 |
| R2 | N | -1.82 | 0.0 | 1.00 | 4.42 | 0.0 | -0.65 | -0.83 | -0.50 |
|    | W | 1.00 | 2.00 | 1.00 | 1.00 | 0.0 | 0.0 | 0.0 | 0.0 |

Thus, it may be seen from the illustrated embodiments that the speed change gear systems of the present invention have important advantages over the prior art systems in that speed change shifts through at least four speed ranges for forward drive can be attained by utilizing three basic planetary gear sets.

Obviously, many modifications and variations of the present invention are possible in light of the above teachings. It is to be understood therefore that within the scope of the appended claims the present invention may be practiced otherwise than as specifically described herein.

What is claimed as new and desired to be secure by Letters Patent of the United States is:

1. A speed change gear system comprising:
an input shaft;
a first sun gear;
a first brake capable of locking said first sun gear to a gear casing;
a first planetary gear engaged with said first sun gear;
a secondary planetary gear engaged with said first planetary gear;
a first ring gear engaged with said secondary planetary gear;
a first carrier rotatably supporting said first and second planetary gears;
a second ring gear drivingly engaged to said first carrier;
a third planetary gear engaged with said second ring gear;
a second sun gear engaged with said third planetary gear;
a second carrier rotatably supporting said third planetary gear;
a third sun gear drivingly engaged with said second sun gear;
a fourth planetary gear engaged with said third sun gear;
a third ring gear drivingly engaged with said first ring gear as well as with said fourth planetary gear;
a third carrier rotatably supporting said fourth planetary gear and engaged with said first carrier and said second ring gear;
a first clutch for coupling or uncoupling said input shaft and said first carrier, said third carrier and said second ring gear;
a second clutch for coupling or uncoupling said input shaft and said first ring gear;
a third clutch coupling or uncoupling said input shaft and said first sun gear;
a second brake capable of locking said first carrier, said third carrier and said second ring gear to said gear casing;
a third brake capable of locking said second and third sun gears to said gear casing; and
an output shaft drivingly engaged with said second carrier.

2. A speed change gear system as set forth in claim 1, additionally comprising:
a fourth ring gear drivingly engaged with said second and third sun gears;

a fifth planetary gear engaged with said fourth ring gear;
a fourth carrier rotatably supporting said fifth planetary gear;
a fourth brake being capable of locking said fourth carrier to said gear casing; and
a fourth sun gear engaged with said fifth planetary gear and rotatably engaged with said output shaft.

3. A speed change gear system as set forth in claim 1, additionally comprising:
a fourth sun gear drivingly engaged with said second and third sun gears;
a fifth planetary gear engaged with said fourth sun gear;
a fourth carrier rotatably supporting said fifth planetary gear;
a fourth brake being capable of locking said fourth carrier to said gear casing; and
a fourth ring gear drivingly engaged with said fifth planetary gear and said output shaft.

4. A speed change gear system as set forth in claim 1, additionally comprising:
a fourth sun gear drivingly engaged with said second and third sun gears;
a fifth planetary gear engaged with said fourth sun gear;
a fourth ring gear engaged with said fifth planetary gear;
a fourth brake being capable of locking said fourth ring gear to said gear casing; and
a fourth carrier rotatably supporting said fifth planetary gear and drivingly engaged with said output shaft.

5. A speed change gear system as set forth in claim 1, additionally comprising:
a fourth sun gear drivingly engaged with said second ring gear and said first and third carriers;
a fifth planetary gear engaged with said fourth sun gear;
a fourth ring gear engaged with said fifth planetary gear;
a fourth brake being capable of locking said fourth ring gear to said gear casing; and
a fourth carrier rotatably supporting said fifth planetary gear and drivingly engaged with said output shaft.

6. A speed change gear system comprising:
an input shaft;
a first sun gear;
a first planetary gear engaged with said first sun gear;
a second planetary gear engaged with said first planetary gear;
a first ring gear engaged with said second planetary gear;
a first carrier rotatably supporting said first and second planetary gears;
a second ring gear drivingly engaged to said first carrier;
a third planetary gear engaged with said second ring gear;
a second sun gear engaged with said third planetary gear;
a second carrier rotatably supporting said third planetary gear;
a third sun gear drivingly engaged with said second sun gear;
a fourth planetary gear engaged with said third sun gear;
a third ring gear drivingly engaged with said first ring gear as well as with said fourth planetary gear;
a third carrier rotatably supporting said fourth planetary gear and engaged with said first carrier and said second ring gear;
a first clutch for coupling or uncoupling said input shaft and said first carrier, said third carrier and said second ring gear;
a second clutch for coupling or uncoupling said input shaft and said first ring gear;
a third clutch coupling or uncoupling said input shaft and said first sun gear;
a brake capable of locking said first carrier, said third carrier and said second ring gear to said gear casing;
another brake capable of locking said second and third sun gears to said gear casing; and
an output shaft drivingly engaged with said second carrier.

7. A speed change gear system as set forth in claim 6, further comprising:
an additional brake capable of locking said first sun gear to said gear casing.

8. A speed change gear system as set forth in claim 6, further comprising:
a fourth ring gear drivingly engaged with said second and third sun gears;
a fifth planetary gear engaged with said fourth ring gear;
a fourth carrier rotatably supporting said fifth planetary gear;
a brake being capable of locking said fourth carrier to said gear casing; and
a fourth sun gear engaged with said fifth planetary gear and rotatably engaged with said output shaft.

9. A speed change gear system as set forth in claim 8, further comprising:
an additional brake capable of locking said first sun gear to said gear casing.

10. A speed change gear system as set forth in claim 6, further comprising:
a fourth sun gear drivingly engaged with said second and third sun gears;
a fifth planetary gear engaged with said fourth sun gear;
a fourth carrier rotatably supporting said fifth planetary gear;
a brake being capable of locking said fourth carrier to said gear casing; and
a fourth ring gear drivingly engaged with said fifth planetary gear and said output shaft.

11. A speed change gear system as set forth in claim 10, further comprising:
an additional brake capable of locking said first sun gear to said gear casing.

12. A speed change gear system as set forth in claim 6, further comprising:
a fourth sun gear drivingly engaged with said second and third sun gears;
a fifth planetary gear engaged with said fourth sun gear;
a fourth ring gear engaged with said fifth planetary gear;
a brake being capable of locking said fourth ring gear to said gear casing; and
a fourth carrier rotatably supporting said fifth planetary gear and drivingly engaged with said output shaft.

13. A speed change gear system as set forth in claim 12, further comprising:

an additional brake capable of locking said first sun gear to said gear casing.

14. A speed change gear system as set forth in claim 6, further comprising:

a fourth sun gear drivingly engaged with said second ring gear and said first and third carriers;

a fifth planetary gear engaged with said fourth sun gear;

a fourth ring gear engaged with said fifth planetary gear;

a brake being capable of locking said fourth ring gear to said gear casing; and a fourth carrier rotatably supporting said fifth planetary gear and drivingly engaged with said output shaft.

15. A speed change gear system as set forth in claim 14, further comprising:

an additional brake capable of locking said first sun gear to said gear casing.

* * * * *